(12) United States Patent
Luchner et al.

(10) Patent No.: US 8,956,049 B2
(45) Date of Patent: Feb. 17, 2015

(54) METHOD FOR PRODUCING A FRACTURE-DIVIDED COMPONENT, AND COMPONENT PRODUCED ACCORDING TO THE METHOD

(75) Inventors: Clemens Luchner, Uebersee (DE); Marc Kronenberg, Munich (DE); Rolf Koring, Juechen (DE); Ralf Kowollik, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/602,924

(22) Filed: Sep. 4, 2012

(65) Prior Publication Data

US 2012/0325046 A1 Dec. 27, 2012

Related U.S. Application Data

(63) Continuation of application No. PCT/EP2011/000492, filed on Feb. 3, 2011.

(30) Foreign Application Priority Data

Mar. 9, 2010 (DE) .......................... 10 2010 010 642

(51) Int. Cl.
*F16C 9/04* (2006.01)
*F16C 33/14* (2006.01)

(52) U.S. Cl.
CPC ................. *F16C 9/045* (2013.01); *F16C 33/14* (2013.01)
USPC ........... 384/226; 427/239; 427/355; 427/359; 427/360; 29/888.01; 29/888.061; 29/898; 72/48; 72/199; 72/208; 72/252.5; 72/365.2; 74/579 R; 74/593; 74/594

(58) Field of Classification Search
USPC ...................................................... 427/407.1
See application file for complete search history.

(56) References Cited

U.S. PATENT DOCUMENTS

| 5,551,782 | A  | * | 9/1996 | Arnhold et al. | ................ 384/294 |
| 6,357,321 | B1 | * | 3/2002 | Schmitt | ....................... 74/579 E |
| 7,178,238 | B2 | * | 2/2007 | Rumpf et al. | .............. 29/888.09 |
| 7,181,842 | B2 | * | 2/2007 | Ederer et al. | ................ 29/888.09 |

FOREIGN PATENT DOCUMENTS

| DE | 43 03 592 A1 | 8/1994 |
| DE | 10 2004 003 403 A1 | 8/2005 |
| DE | 10 2004 018 921 A1 | 11/2005 |
| DE | 10 2007 021 622 A1 | 11/2008 |
| DE | 10 2008 057 159 A1 | 5/2010 |
| EP | 1 225 348 A2 | 7/2002 |
| EP | 1 990 127 A2 | 11/2008 |
| GB | 2 344 151 A * | 5/2000 |
| JP | 11-70423 A * | 3/1999 |
| JP | 2002-021634 A * | 1/2002 |
| WO | WO 94/18463 A1 * | 8/1994 |

OTHER PUBLICATIONS

English-language machine translation of the Description of EP 1 990 127, generated Sep. 28, 2014, 20 pages.*
German Search Report dated Oct. 21, 2010 including partial English-language translation (Nine (9) pages).
International Search Report dated Jun. 8, 2011 including English-language translation (Six (6) pages).

* cited by examiner

*Primary Examiner* — William Phillip Fletcher, III
(74) *Attorney, Agent, or Firm* — Crowell & Moring LLP

(57) ABSTRACT

A method for producing a fracture-divided component, in particular a connecting rod, with an at least partially coated bore includes the steps of: providing an unfinished component; applying a coating of a bearing material to a bore surface; and working the coating, in order to compensate internal tensile stresses in the coating, before fracture division of the component. Alternatively, the method for producing a fracture-divided component, in particular a connecting rod, having an at least partially coated bore includes the steps of: providing an unfinished component; applying a coating of a bearing material to a bore surface before fracture division of the component; and forming a counter-hardness zone before the application of the coating in order to generate compressive stresses which oppose the internal tensile stresses of the coating.

23 Claims, 1 Drawing Sheet

METHOD FOR PRODUCING A FRACTURE-DIVIDED COMPONENT, AND COMPONENT PRODUCED ACCORDING TO THE METHOD

CROSS-REFERENCE TO RELATED APPLICATIONS

This application is a continuation of PCT International Application No. PCT/EP2011/000492, filed Feb. 3, 2011, which claims priority under 35 U.S.C. §119 from German Patent Application No. DE 10 2010 010 642.9, filed Mar. 9, 2010, the entire disclosures of which are herein expressly incorporated by reference.

BACKGROUND AND SUMMARY OF THE INVENTION

The invention relates to a method of producing a fracture-divided component, particularly a connecting rod, having an at least partially coated bore. The invention also relates to a component produced according to the method.

In the case of components which have no separate sliding or rolling bearings, such as integral connecting rods for motor vehicle internal-combustion engines, it is known to temper or to coat the bearing surfaces of the components, so that the latter withstand high stress. Likewise, it is known to produce bearing components in one pass and only subsequently separate one bearing half by fracture-division if the later assembly requires a divided component (for example, connecting rod big end and connecting rod bearing cap).

German Patent documents DE 10 2004 003 403 A1 and DE 10 2004 018 921 A1 describe manufacturing methods by which at least the large bearing eye of a connected rod is coated before it is fracture-divided. In the case of these methods, it is assumed that, after the thermal coating with a high-melting bearing material (for example, copper-(Cu—) based, permissible component or substrate temperature>200° C. after the finishing of the coating), no or only negligible internal tensions are present in the actual connecting rod as well as in the substance-bonded coating, so that the fracture-divided component halves can be assembled again in a precisely fitting manner without any straightening operation or auxiliary assembly tools.

However, tests have shown that, after the coating of bearing components with low-melting bearing materials (such as tin antimony alloys (SnSb) systems, permissible component or substrate temperature<100° C. after the finishing of the coating), internal tensile stresses are present in the coating, which are released when fracture-dividing the bearing halves. The therefore occurring varying degrees of distortion of the bearing halves because of different rigidities have the result that, for a precisely fitting reassembly, the bearing halves either have to be straightened during a finishing or during the mounting, or that auxiliary tools are required.

Analogously, the same applies to high-melting bearing materials and an occurring component or substrate temperature of <200° C. after the finishing of the coating.

From German Patent document DE 10 2007 021 622 A1, a method is known for producing a fracture-divided bearing component of carbon steel, where a tempering and/or coating of a bearing surface takes place at least in sections, which tempering and/or coating is connected with the introduction of tensions. Before or after the fracture-dividing, a partial heat treatment for a targeted introduction of counter-tensions or a working is therefore provided. In this case, it is assumed that, when fracture-dividing a connecting rod made of carbon steel that is provided with a copper-based coating, there will be varying degrees of "spring-back" of the bearing halves (connecting rod big end and connecting rod bearing cap). Spring-back means that the overall dimension (width measurement) of a bearing half will be larger after the fracture division than before the fracture division. A spring-back will occur when there is, for example, a martensite structural transformation (increase in volume as a result of martensite formation) in the bore area close to the surface.

It is an object of the invention to provide an advantageous method of producing a fracture-divided component, whereby, particularly in the case of a coating with a low-melting material, it is ensured that the two component halves can be reassembled in a precisely fitting manner after the fracture division.

According to a first aspect of the invention, a method for producing a fracture-divided component, particularly a connecting rod, having an at least partially coated bore, comprises the following steps:

providing an unfinished component;
applying a coating of a bearing material to a bore surface; and
working the coating in order to compensate internal tensile stresses in the coating before a fracture division of the component.

The invention is based on the recognition that, particularly in the case of a coating of a component with a low-melting bearing material, for example, with an Sn-based powder, tensile stresses are induced in the coating which result in a "falling-in" after the fracture division. The overall dimension (width measurement) of a bearing half will therefore be smaller after the fracture division than before the fracture division. In the concrete case of a connecting rod that is fracture-divided at the large connecting rod eye, the coated connecting rod bearing cap will therefore fall in compared with the uncoated connecting rod big end because of different rigidities. The invention counteracts this undesirable effect in that the coating is mechanically worked before the fracture division of the component in order to compensate the internal tensile stresses in the coating.

The working preferably includes a rolling, particularly a deep rolling of the coating.

The internal tensile stresses in the coating can additionally be counteracted in that, before the working, the coating is reduced to a defined measurement within the scope of a material-removing intermediate machining.

In the case of bearing components exposed to maximum stress, the working (rolling) can intentionally be increased to such an extent that inherent compressive stresses remain in the coating. In addition to the working of the coating, a counter-hardness zone can be formed for generating counter-compressive stresses which oppose the internal tensile stresses of the coating.

The counter-hardness zone is preferably formed before the application of the coating and preferably on the outer contour of the component. The size, shape and position of the counter-hardness zone can be determined experimentally.

According to a second aspect of the invention, a method for producing a fraction-divided component, particularly a connecting rod, having an at least partially coated bore, comprises the following steps:

providing an unfinished component;
applying a coating of a bearing material to a bore surface before a fracture division of the component; and
forming a counter-hardness zone before the application of the coating in order to generate compressive stresses which oppose the internal tensile stresses of the coating.

In the case of this alternative method, the tensile stresses induced in the coating, which result in a "falling-in" after the fraction division of the component, are counteracted just by forming a counter-hardness zone before the coating is applied. The counter-hardness zone generates compressive stresses in the component, which oppose the internal tensile stresses of the coating.

The counter-hardness zone is preferably formed on the outer contour of the component. The size, shape and position of the counter-hardness zone can, in turn, be determined experimentally.

The invention thus also provides a component, particularly a connecting rod, produced according to the method of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
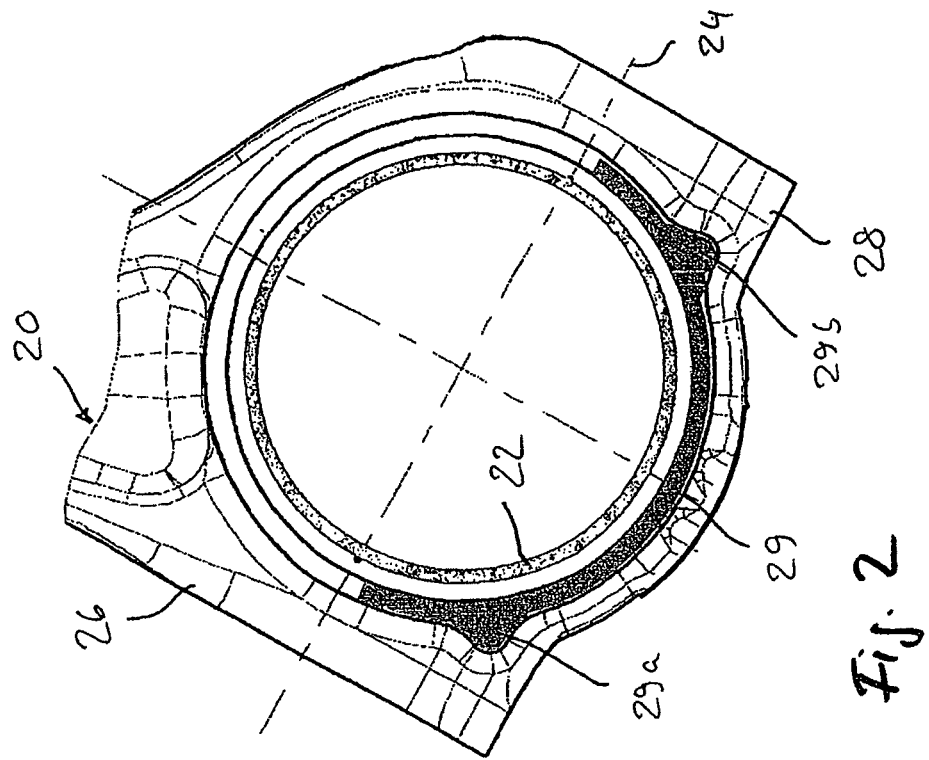
FIG. 1 is a view of a part of a first connecting rod.

The figures each illustrate the large bearing eye of a bearing component constructed as a connecting rod 10 and 20, respectively, for a motor vehicle internal-combustion engine. The connecting rods 10, 20 are produced by forging, sintering or sinter forging. The large bearing eye is provided with a functional layer 12, 22 formed by coating its interior surface, which functional layer 12, 22 is based on a tin (Sn) powder. The functional layer 12, 22 is applied thermally by use of a laser, so that a material bond is formed between the basic connecting rod material and the bearing material forming functional layer 12, 22.

Depending on the requirements, the functional layer 12, 22 covers particularly the entire inner bore surface of the large bearing eye or only a portion thereof. The functional layer 12, 22 may only extend around approximately 180° of the bore circumference. The axial dimension of the radially completely surrounding or partial functional layer 12 may also vary; for example, a defined axial distance from the bore edge may be provided.

Tensile stresses are induced in the functional layer 12, 22 by the coating with an Sn-based bearing material. These internal stresses are a result of the fact that, during the coating, because of the low melting temperature of the Sn material, the component must not become appreciably hot (maximally 100° C.). Otherwise, the bearing material will not solidify sufficiently rapidly which results in a coarse textural structure with poor fatigue strength characteristics.

A connecting rod bearing cap 18 and 28, respectively, can be separated from the connecting rod big end 16 and 26, respectively, by a fracture division along plane 14 and 24, respectively. In the embodiments illustrated in the figures, only the bore surface of the connecting rod bearing cap 18, 28 is coated. In the case of a fracture division of the coated connecting rod 10, 20, the internal tensile stresses present in the Sn-based functional layer 12, 22 would lead to a falling-in of the connecting rod bearing cap 18, 28 with respect to the connecting rod big end 16, 26.

For this reason, according to a first alternative of the method, the functional layer 12, 22 is worked before the fracture division in order to compensate the internal tensile stresses in the coating. The working takes place by rolling (deep rolling, not finish rolling), for which commercially available tools can be used. The mechanical pre-machining required for this purpose represents either a separate process step (reboring) or is carried out by means of a suitable combination tool (for example, with a peeling and rolling part) in the next process step.

In the case of the most stressed bearing components, the bearing material is heavily rolled such that the internal tensile stresses are not only compensated but that inherent compressive stresses remain in the coating. If required, this measure is combined with the formation of one or more additional counter-hardness zones 19 and 29, respectively, for generating counter-compressive stresses which oppose the internal tensile stresses of the coating. The counter-hardness zones 19, 29 are formed before the application of the coating on an outer contour of the component, the size, shape and position of the counter-hardness zones 19, 29 being determined experimentally. Details of the production of the counter-hardness zones 19, 29 will be explained in the following within the scope of the second alternative of the method.

According to the second alternative of the method, the different rigidities of the connecting rod big end 16, 26 and of the connecting rod bearing cap 18, 28 are adapted merely by the fact that, instead of the rolling of the bearing material, even before the application of the coating, at least one counter-hardness zone 19, 29 is formed for generating compressive stresses which oppose the internal tensile stresses of the subsequently produced function layer 12, 22.

The counter-hardness zones 19, 29 are formed in that predetermined areas of the outer contour of the component are subjected to a partial heat treatment (laser hardening or inductive hardening). The size, shape and position of the counter-hardening zones 19, 29 as well as their effective hardening depth may, in turn, be empirical; for example, may be determined by means of the fracture division of reference components without counter-hardness zones, before the fracture division. As an alternative, the component bore to be coated can also completely or partially be subjected to a heat treatment (laser hardening or inductive hardening).

Figure 2:
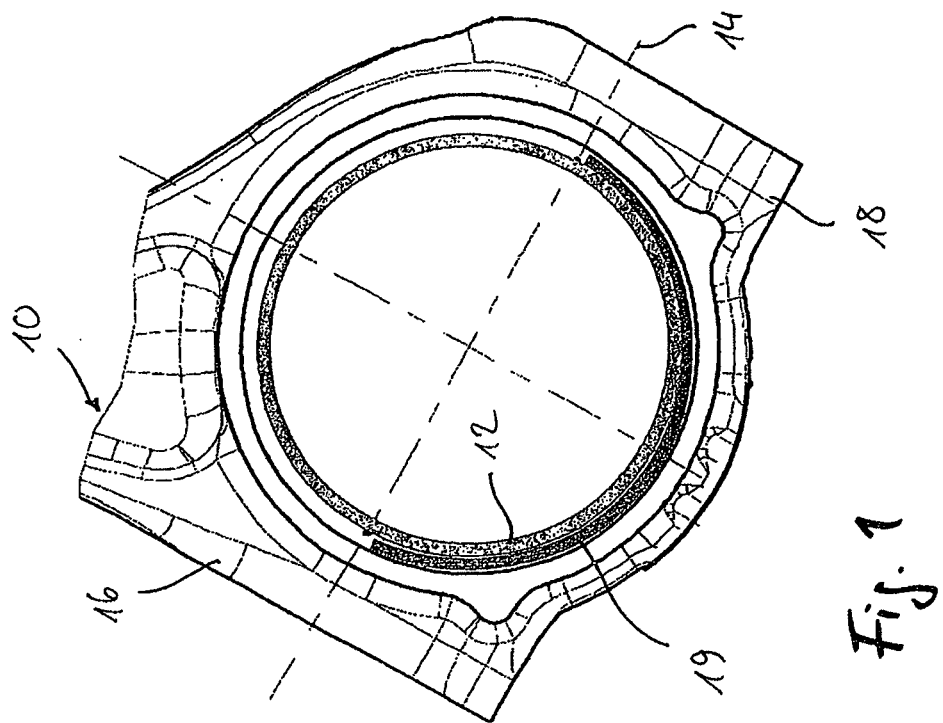
FIG. 2 is a view of a part of a second connecting rod.

FIG. 1 illustrates a connecting rod 10 having a functional layer 12 integrated by coating and a counter-hardness zone 19 at the connecting rod bearing cap 18 arranged in direct proximity of the bearing coating. In the case of the connecting rod 20 illustrated in FIG. 2, the counter-hardness zone 29 at the connecting rod bearing cap 28 has two expanded areas 29a, 29b and is slightly spaced away from the functional layer 22.

After the coating as well as the preceding hardening and/or subsequent working, the connecting rod bearing cap 18, 28 is separated from the connecting rod big end 16, 26 by fracture division. Because of the above-described measures, the stresses in the connecting rod 10, 20 are distributed such that, after the fracture division, the individual parts of the component, here, the connecting rod big end 16, 26 and the connecting rod bearing cap 18, 28 can be perfectly joined without straightening or mounting aids, and a lateral abutting is avoided. The process is therefore reproducible and the functional reliability is ensured. As a rule, a finishing takes place after the fracture division of the component, which comprises cleaning, surface grinding and/or honing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing a fracture-divided component having an at least partially coated bore, the method comprising the acts of:

providing an unfinished component, applying a coating of a bearing material to a bore surface of the component; and working the coating in order to compensate internal tensile stresses in the coating, before a fracture division of the component such that after the fracture division a first fracture portion of the component coated with the bearing material maintains a width dimension equal to a width dimension of a second fracture portion of the component.

2. The method according to claim 1, wherein the working comprises the act of:

rolling the coating.

3. The method according to claim 1, wherein the coating is reduced to a defined measurement before the working.

4. The method according to claim 1, wherein, in addition to the working of the coating, a counter-hardness zone is formed for generating counter-compressive stresses, which oppose internal tensile stresses of the coating.

5. The method according to claim 4, wherein the counter-hardness zone is formed at an outer contour of the component.

6. The method according to claim 4, wherein the counter-hardness zone is formed on the component bore to be coated.

7. The method according to claim 4, wherein at least one of a size, shape, position and hardening depth of the counter-hardness zone is determined experimentally 8. The method according to claim 4, wherein the counter-hardness zone is formed before the applying of the coating.

9. The method according to claim 1, wherein the component is a connecting rod for an engine.

10. The method according to claim 1, wherein the applying of the coating is carried out by thermally applying the coating using a laser.

11. The method according to claim 1, wherein the bearing material for the coating is a low-melting material.

12. The method according to claim 11, wherein the low-melting material is a Sn-based material.

13. A component produced according to the method of claim 1, wherein working the component in order to compensate internal tensile stresses in the coating comprises mechanically working the coating.

14. The component according to claim 13, wherein the component is a connecting rod for an engine.

15. A method of producing a fracture-divided component having an at least partially coated bore, the method comprising the acts of:

providing an unfinished component;

applying a coating of a bearing material to a bore surface of the component before a fracture division of the component; and forming a counter-hardness zone before applying of the coating for generating counter-compressive stresses which oppose internal tensile stresses of the coating such that after the fracture division a first fracture portion of the component coated with the bearing material maintains a width dimension equal to a width dimension of a second fracture portion of the component.

16. The method according to claim 15, wherein the counter-hardness zone is formed at an outer contour of the component.

17. The method according to claim 15, wherein the counter-hardness zone is formed on the component bore to be coated.

18. The method according to claim 15, wherein at least one of a size, shape, position and hardening depth of the counter-hardness zone is determined experimentally.

19. The method according to claim 15, wherein the applying of the coating is carried out by thermally applying the coating using a laser.

20. The method according to claim 15, wherein the bearing material for the coating is a low-melting material.

21. The method according to claim 20, wherein the low-melting material is a Sn-based material.

22. A component produced according to the method of claim 15, wherein the component comprises mechanically-worked properties.

23. The component according to claim 22, wherein the component is a connecting rod for an engine.

* * * * *